UNITED STATES PATENT OFFICE.

JOHN DIMELOW, OF AUSTIN, TEXAS, ASSIGNOR TO THERESA MARTIN, OF SAME PLACE.

IMPROVEMENT IN THE MANUFACTURE OF HYDRAULIC CEMENT.

Specification forming part of Letters Patent No. 205,253, dated June 25, 1878; application filed June 3, 1878.

*To all whom it may concern:*

Be it known that I, JOHN DIMELOW, of Austin, Travis county, Texas, have invented a new and useful Improvement in Hydraulic Cement, of which the following is a specification:

The object of this invention is to furnish a superior article of hydraulic cement from refuse material which is now regarded as worthless, so that any city can supply itself with all the cement it requires for building and other purposes at a comparatively small cost.

The invention consists in the mode of preparing hydraulic cement from rotten, decomposed, or refuse limestone or marble and the deposit of rivers, and in a hydraulic cement formed of rotten, decomposed, or refuse limestone or marble and the deposit of rivers, in about equal proportions, as hereinafter fully described.

In preparing this cement, the rotten, decomposed, or refuse limestone or marble is thoroughly burned for at least six hours after becoming blood-red. This calcined matter and the deposit of rivers, consisting of clay, lime, sand, mica, iron, and other metallic oxides, &c., are mixed together in about equal proportions, and soaked in water for from twelve to twenty-four hours, (the longer the better,) and the composition is then cast into a mixing-mill similar to a brick-maker's "pug-mill," with sufficient clean, cold water to reduce the mixture to about the consistency of thick cream. The mixture is then passed through strong but fine horse-hair sieves, into an evaporating-pan, under which, for its whole length, fire passes.

When the water has been evaporated, which will require about ten or twelve hours, the hydraulic matter is cut up into chunks, or pressed into the shape of bricks, and dried. When thoroughly dry these blocks or bricks are taken to a furnace and burned with a regular, increasing, slow heat for from six to eight hours after becoming blood-red. They are then taken from the furnace and ground fine—the finer the better.

The cement thus prepared may be used for any and all the purposes for which a hydraulic cement is used. It may also be molded into the shape of bricks, blocks, roofing-tiles, &c., and burned in a kiln, when they will become hard, will constantly become harder, and will be unaffected by heat, cold, and wet.

Having thus described my invention, I claim as new and desire to secure by Letters Patent—

1. The mode of preparing hydraulic cement from rotten, decomposed, or refuse limestone or marble and the deposit of rivers, by burning the refuse limestone or marble, mixing it with the deposit of rivers, soaking the mixture in water, grinding it, sifting it, evaporating the water, cutting or molding it into blocks, drying them, burning them in a furnace, and grinding them to powder, substantially as herein set forth and described.

2. A hydraulic cement formed of rotten, decomposed, or refuse limestone or marble and the deposit of rivers, in about equal proportions, substantially as herein set forth.

JOHN DIMELOW.

Witnesses:
 JUAN V. BENAVIDES,
 E. C. BARTHOLOMEW.